United States Patent

[11] 3,624,339

| [72] | Inventor | Henry H. Jenkins<br>864 West Hacienda Drive, Corona, Calif.<br>91720 |
|---|---|---|
| [21] | Appl. No. | 862,259 |
| [22] | Filed | Sept. 30, 1969 |
| [45] | Patented | Nov. 30, 1971 |
| | | Continuation-in-part of application Ser. No. 648,763, June 26, 1967, now Patent No. 3,483,348, dated Dec. 9, 1969, which is a continuation-in-part of application Ser. No. 583,629, Sept. 30, 1966, now abandoned. This application Sept. 30, 1969, Ser. No. 862,259 |

[54] ELECTRIC ARC-TYPE CUTTING GUN
3 Claims, 15 Drawing Figs.

[52] U.S. Cl. .................................................. 219/70,
219/143, 239/394, 239/562
[51] Int. Cl. ........................................................ B23k 9/00
[50] Field of Search .......................................... 219/70,
143; 239/394, 562

[56] References Cited
UNITED STATES PATENTS

| 356,598 | 1/1887 | Moore .......................... | 239/394 |
|---|---|---|---|
| 1,927,135 | 9/1933 | Sammons ..................... | 219/70 |
| 2,458,723 | 1/1949 | Nilsson ......................... | 219/143 |
| 3,113,201 | 12/1963 | Stepath ......................... | 219/70 |

*Primary Examiner*—R. F. Staubly
*Attorney*—Woodling, Krost, Granger and Rust

ABSTRACT: An electric arc cutting gun including a housing defining an insulated handle part for gripping by an operator through which air under pressure is passaged to a head. The air is controlled through a hand-operated valve and a heat shield protects the hand of an operator. The head includes an opening extending therethrough and a tubular member mounted therein defines an annular space or chamber with the opening. The ends of the annular space are closed and a tubular chuck is included and is adapted to hold an electrode which may be inserted into either end of the chuck. The annular space is connected to the air passage. A plurality of openings are provided to exit the annular space to emit air around the electrode held by the chuck. The tubular member and tubular chuck are constructed or formed of the same member. Another chuck construction is disclosed which utilizes a spring-biased ball member which extends through an opening in the tubular member to engage an electrode which extends therethrough. A deflector means is attached to the housing to block off selected ones of the air openings as desired.

INVENTOR.
HENRY H. JENKINS

INVENTOR.
HENRY H. JENKINS

INVENTOR.
HENRY H. JENKINS

ELECTRIC ARC-TYPE CUTTING GUN

This application is a continuation-in-part application of Ser. No. 648,763 filed June 26, 1967 now Pat. No. 3,483,348 issued Dec. 9, 1969, which was a continuation-in-part of Ser. No. 583,269 filed Sept. 30, 1966 now abandoned.

An object of the present invention relates in general to a gun or apparatus for metal cutting and more particularly to such a device which utilizes an electrode around which compressed air is expelled in such a manner as to remove metal which has been melted as a result of an electric arc between the electrode and the work.

Another object of the present invention is to provide a metal cutting or gouging gun which is economical in construction and which is efficient in operation.

Another object of the present invention is to provide a metal cutting gun which includes an electrode and means for ejecting compressed air along and around the electrode to blow melted metal away in such a way that the molten metal is not thrown as far and as wildly as in prior devices.

Another object of the present invention is to provide a metal cutting gun with compressed air ejection openings designed to efficiently eject air from a compressed air chamber to the end of the electrode used in striking and maintaining the arc.

Another object of the present invention is to provide a metal cutting gun which is of a pistol grip type construction with a heat shield at the grip and a manual air valve in a position to be conveniently manipulated by an operator's finger.

Another object of the present invention is to provide a metal cutting gun which has a spring finger-type chuck for holding electrodes which chuck is open at both ends to provide for the continuous feeding of electrodes.

Another object of the present invention is to provide a metal cutting gun having an electrode around which a plurality of air ejecting openings are located which lead from a supply chamber and which have a length over diameter ratio of at least 6 and more preferably at least 8.

Other objects and a fuller understanding of this invention may be had by referring to the following description and claims, taken in conjunction with the accompanying drawings, in which:

Figure 1:
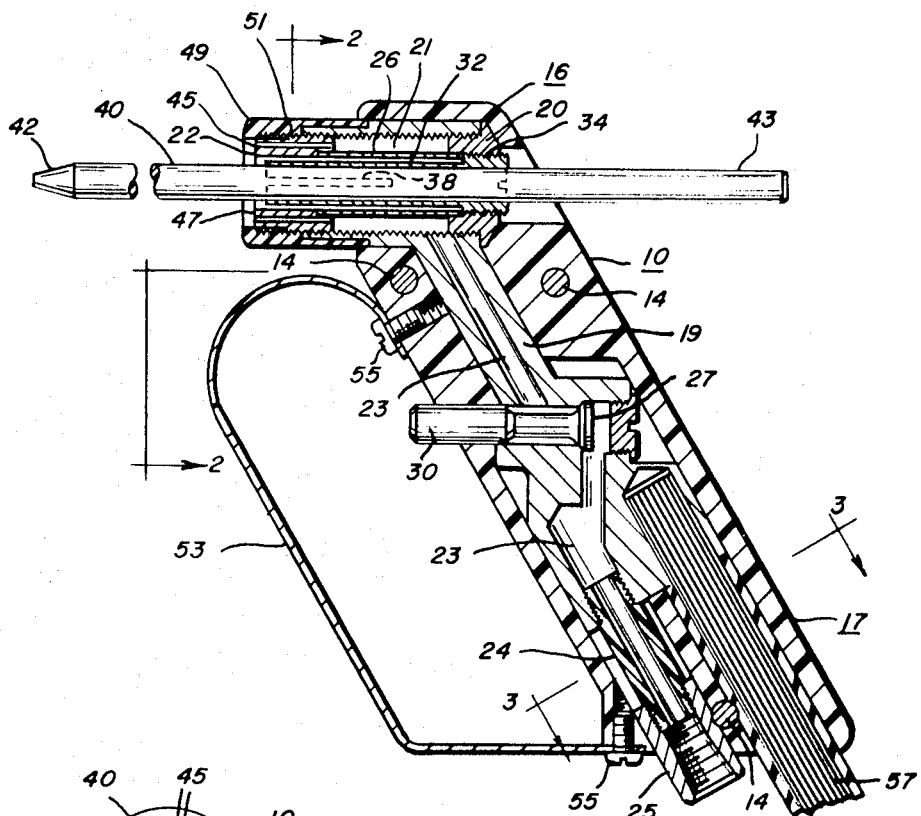
FIG. 1 is an elevational view in section of the metal cutting gun constructed in accordance with the teachings of the present invention.

The metal cutting gun of the present invention includes in combination a housing 10 preferably of a plastic material or other suitable electrical insulating construction and as will be noted, the housing comprises first and second mating parts 12 and 13 which are held together by three screws 14. The housing 10 also has first and second end portions 16 and 17, respectively. A metal body member 19 is located in the housing and is held in a fixed position therein by means of the screws 14. Wall means are provided in the metal body member which serve to define the outer limits of an annular air chamber 21 which is located at the first end portion 16 of the housing. The air chamber 21 is closed at one end by a threaded plug 20 and at the other end by a threaded air ejection member 22. A piece of tubing 26 is press fitted at one end into the bore of plug 20 and at the other end mates with an internal bore through the air ejection member 22 to define the inner limits of the chamber 21. Wall means 23 are provided in the metal body member and define an air passage which extends from the air chamber 21, through the body member and terminates at the second end portion 17 of the housing. The air passage 23 at the second end portion is comprised of a plastic nipple 24 threadably secured to the body member 19 at one end portion and at its other end it is threadably secured to a pipe threaded coupling 25. The pipe threaded coupling 25 comprises a means for connecting a pressurized source of air (not shown) to the air passage 23 to supply pressurized air to the air chamber 21. An air valve 27 is located in the air passage 23 and is normally biased to a closed position by means of air under pressure traveling from coupling 25 through passage 23 on its way to chamber 21. It of course would be possible to interpose a spring to aid in closing the valve. A plunger 30 or actuating member is connected to the air valve and extends exteriorly of the housing 10 in a position to be moved by an operator of the gun. When an operator moves the plunger 30 the valve moves to an open position and air may travel from a source to the air chamber 21. The plunger 30 may be conveniently provided with a mechanism to keep it in a depressed condition so that an operator of the device need not continuously hold the air valve open during operation of the gun. A convenient source of air pressure for the metal cutting gun of the present invention might be conventional shop air pressure found in most commercial establishments.

A chuck assembly is provided which includes an annular chuck member 32 which extends axially through the air chamber 21. Also included in the assembly is the tubing 26. One end of the annular chuck member is threadably secured to a plug 20 by threads as at 34 and another end portion of the chuck member extends through the tubing 26 in a cantilever fashion. The other end portion of the annular chuck member 32 is provided with a plurality of circumferentially spaced and axially extending slots 38 which slots serve to define spring fingers therebetween which are for the purpose of holding an electrode 40 which is adapted to extend axially therethrough. When the electrode becomes worn away at end 42, it is only necessary for an operator to push on the opposite end 43 to extend end 42 of the electrode and the spring fingers of the chuck member 32 are not strong enough to resist such urging by an operator, however, the spring fingers firmly hold the electrode in place during operation of the device.

The air ejection member 22, outward of the slots 38, is provided with a plurality of axially extending air openings 45, each being separate from the next adjacent opening and as a result circumferentially spaced from each other. Each of these openings communicates at one end with the air chamber 21 and then extends axially parallel with an electrode held in the chuck to the left, as seen in FIG. 1, and they each terminate at the front face 47 of the air ejection member 22. A shield 49 is threadably secured at 51 to threads on the exterior of the air ejection member 22 and this shield 49 extends axially a short distance beyond the front face of the chuck member and the air ejection member and extends annularly around the same to provide physical protection during handling and operation of the gun. The air exit openings 45 are designed so as to appropriately direct air to the end 42 of an electrode 40 during operation of the same as to blow melted metal from the area which is being cut, gouged, or beveled. It has been found that the diameter and the length of the openings should bear a direct relationship to each other. It has been found that the ratio of the length of the opening over the diameter of the opening should be at least equal to 6 or greater and preferably at least 8. In other words, if the diameter of the opening were one thirty-second of an inch, the length of the opening should be at least six thirty-second of an inch.

Figure 2:
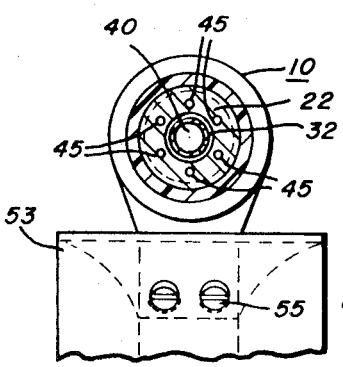
FIG. 2 is a view taken generally along the line 2—2 of FIG. 1.

A heat shield 53 is provided which has a comparatively large width as seen in FIG. 2 and is held in position by screws 55. This heat shield 53 is in the proper position on the housing so as to shield the fingers and hand of an operator of the device from the heat generated at the tip 42 of an electrode 40 during use of the gun. An electric cable 57 enters the housing 10 in the same area as the pipe threaded coupling 25 and is suitably attached to the metal body member 19. The purpose of this cable is to transmit an electrical potential to an electrode 40 which is held in the chuck member 32. This electrical potential is transmitted through the metal body member, plug 20 and the chuck 32 which is threadable secured thereto at 34 and thence through the electrode 40. The material of construction of the electrode is preferably carbon.

In order to utilize the present device it is necessary that an electrode 40 be inserted into the gun by placing the end 42 into the right end of the chuck as seen in FIG. 1 and pushing the same through to an appropriate operating position. Electrical potential is applied to the electrode by way of cable 57 and air under pressure is admitted to chamber 21 by opening of the air valve 27 by way of the plunger 30. An operator of the device grips the housing in the same manner as he would in gripping a revolver or pistol and an arc is struck between the metal work and the end 42 of the electrode. Because of the potential difference between the work which is grounded and the end 42 of the electrode, an arc is maintained by holding the end 42 an appropriate distance from the work and as metal is melted, air traveling from the openings 45 blows the melted metal away leaving a void or opening and obviously many configurations may be cut in a metal surface depending upon the direction and method of movement of the gun. The construction of the air exit openings 45 as discussed hereinabove accomplishes an extremely effective removal of metal which is melted, resulting in the fact that for a given electrode size, it is possible to cut a cleaner, deeper and wider groove than in prior art devices because the air emanating from all sides of the electrode and dispersed from the constructed openings, tends to effectively remove the metal while not subjecting personnel working in the area to the dangerous splashing of metal as in prior art devices. The present metal cutting gun or apparatus operates in all work positions and operates in any direction by the simple expedient of an operator merely directing the device in a different direction. The action of the air in traveling from the openings exerts a cooling effect upon the electrode and the expelling of the air from chamber 21 also creates a cooling or refrigerating effect upon the gun. Te convenient construction of the chuck and its connection to the metal body member 19 also assures less arcing and burning of the parts of the chuck which grip the electrode. It will also be apparent from a review of the above structure, operation, and result, that 11 of the hereinabove stated objects are carried out and accomplished.

Figure 4:
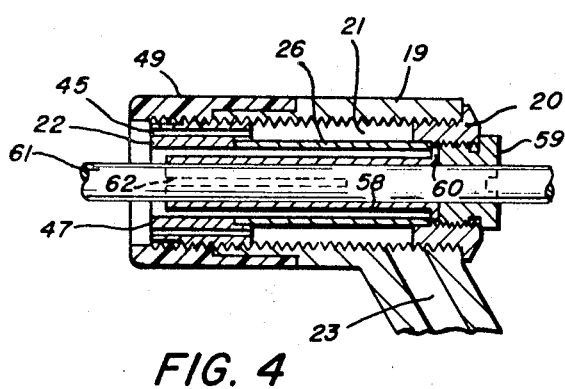
FIG. 4 is an enlarged fragmentary view of a modification of the electrode chuck shown in FIG. 1.

FIG. 4 illustrates a modification of the means for holding the electrode chuck. As in the device of FIG. 1, there is shown the body member 19 along with plug 20, air ejection member 22 and tubing 26. The electrode chuck 58 is a nonthreaded member held in place by means of a retainer 59 threadably secured to plug 20 and bearing against a shoulder 60 on the chuck 58. An electrode 61 is held by spring fingers on the chuck which in turn are formed by slots 62.

Figure 3:
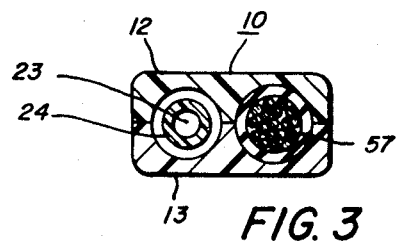
FIG. 3 is a view taken generally along the line 3—3 of FIG. 1.
Figure 5:
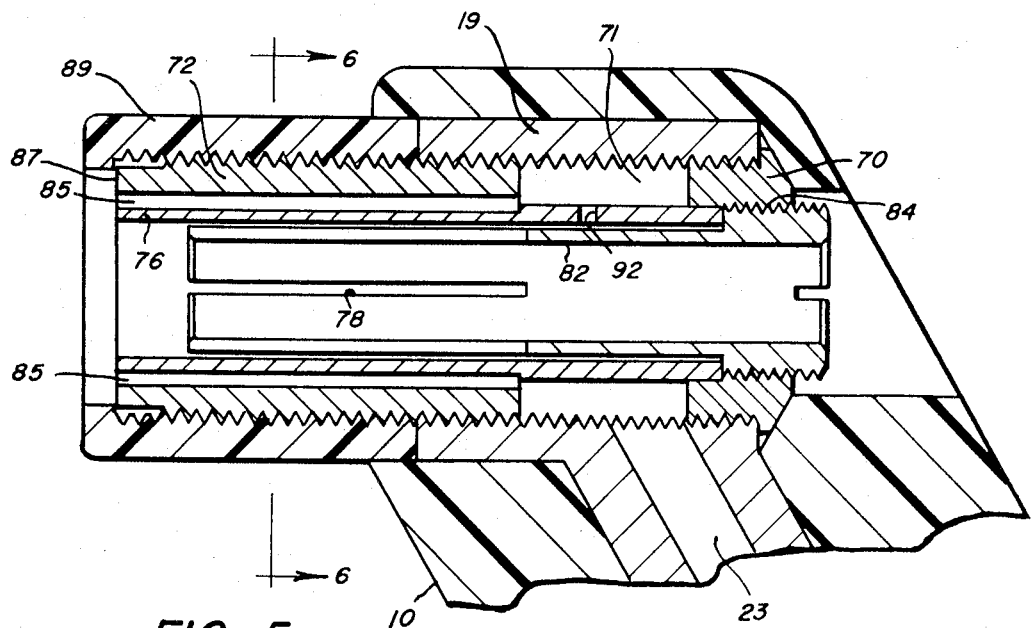
FIG. 5 is an enlarged fragmentary view of a modification of the head of the metal cutting gun shown in FIG. 1.
Figure 6:
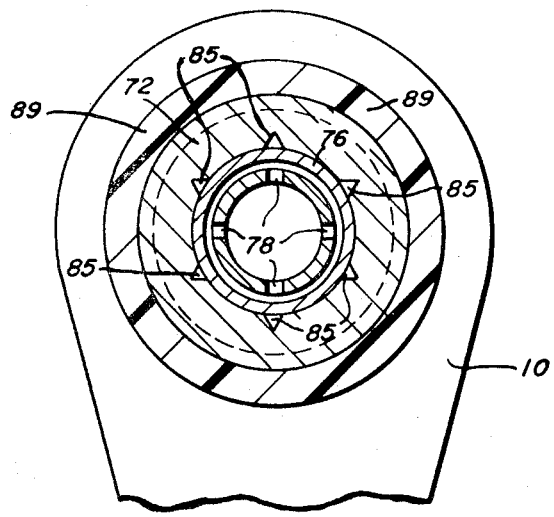
FIG. 6 is a view taken generally along the line 6—6 of FIG. 5.

FIGS 5 and 6 show a modification of the metal cutting gun which is shown in FIGS. 1, 2 and 3. In this embodiment the structure includes the previous housing 10 and the metal body member 19 which is located therein defines the outer limits of an air chamber 71 and the air chamber 71 is closed at one end by a threaded plug 70 and at the other end by a threaded air ejection member 72. A piece of tubing 76 is press fitted at one end into the bore through the air ejection member 72 and at the other end mates with an internal bore of the threaded plug 70. This piece of tubing defines the inner limits of air chamber 71.

A chuck assembly is provided which includes a tubular chuck member 82 which extends axially through the air chamber 71. One end of the chuck member 82 is threadably secured to plug 70 by threads 84 and the other end of the chuck member extends through the tubing 76 in cantilever fashion. The other end portion of the tubular chuck member 82 is provided with a plurality of circumferentially spaced and axially extending slots 78 which serve to define spring fingers therebetween for the purpose of holding an electrode as described in conjunction with FIG. 1. The air ejection member 72 is provided with a plurality of axially extending air openings 85. These openings are circumferentially spaced from each other and serve to completely surround the chuck member 82. These openings exit the air ejection member 72 at the front face 87 thereof and 11 will be noted that a shield 89 is threadably secured to the air ejection member and extends axially a short distance beyond the front face of the air ejection member.

Figure 7:
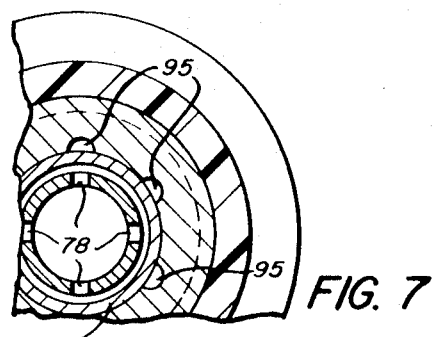
FIG. 7 and 8 are views showing different shapes of air openings.
Figure 8:
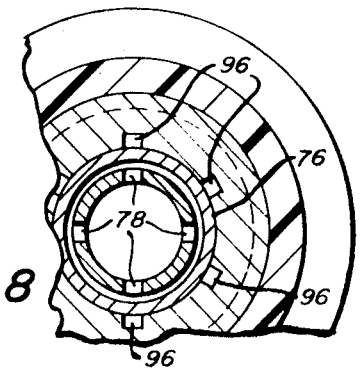

An opening 92 is provided in the wall of the tubing 76 to provide a passage from the air chamber 71 into the interior of the tubing 76 where the chuck member 82 is located. This small opening permits the passage of a relatively small amount of air around the chuck member 82, which is adapted to hold an electrode, and serves to exert a cooling effect on the chuck member resulting in longer life. Those skilled in the art are familiar with the fact that the chuck members tend to heat up during use because of the passage of electrical current through the same during operation of the device. The device illustrated in FIGS. 5 and 6 is utilized in the same manner as the device described in FIGS. 1, 2 and 3. It will be noted that the outside surface of the tubing 76 serves to define one side of the generally triangularly shaped air openings 85. FIGS. 7 and 8 demonstrate different shaped air openings 95 and 96 which are generally semicircular and rectangular in configuration.

Figure 9:
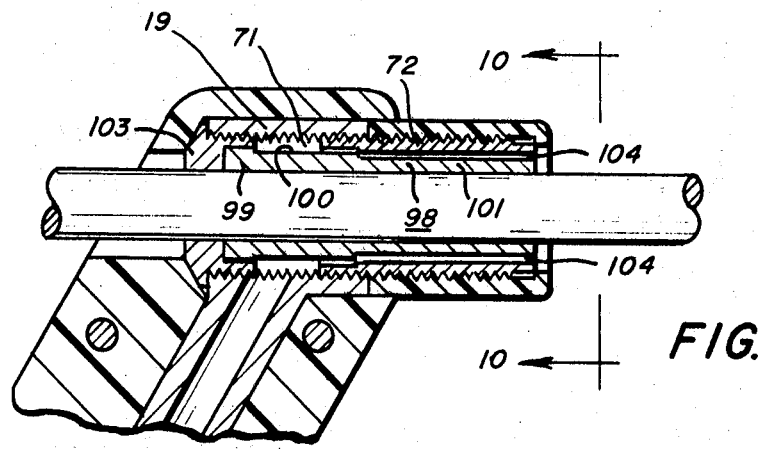
FIG. 9 is a fragmentary elevational view in section of a modification of the head of the metal cutting guns shown in FIGS. 1 and 5.
Figure 10:
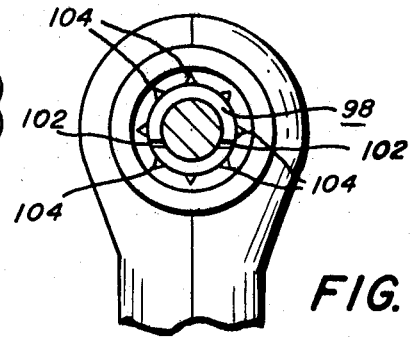
FIG. 10 is a view taken generally along the line 10—10 of FIG. 9.

FIGS. 9 and 10 illustrate a modification of the metal cutting guns which are shown in FIGS. 1 and 5. In this particular embodiment the same housing is utilized and this modification will be discussed only in the respects that it differs over the modifications shown in FIGS. 1 and 5 of the drawings. In this regard, there is provided a tube or annular member 98 which is provided with first, second and third diameter portions 99, 100 and 101. This particular embodiment differs from FIG. 5 in that the tube 98 not only serves to define the air chamber 71 in combination with the metal body member 19, but the third diameter portion is provided with two axially extending slots 102 which form the gripping fingers for holding the electrode which extends axially therethrough. This modification takes the place of the members 76 and 82 in FIG. 5. The back end of the air chamber 71 is closed by a threaded plug 103 which is contoured to receive the first diameter portion 99 so as to hold the tube 98 firmly in position where a shoulder which is formed between the second and third diameter portions 100 and 101 engages a corresponding shoulder on air ejection member 72. Air openings 104 are formed by wall means in the air ejection member 72 and the outside diameter of tube 98. In other respects, the modification of FIGS. 9 and 10 functions in the same manner as the device of FIG. 5 and so no detailed description of the operation will be given.

The advantages of this particular modification over the device of FIG. 5 is that single tube 98 results in a mechanically stronger construction and this particular construction is able to carry a much larger current. The air openings 104 extend in this particular embodiment immediately adjacent the outer surface of the tube 98 and enables much more efficient cooling of the tube member from which the chuck is formed. Additionally, this particular construction enables the air which is emitted from openings 104 to be in very close proximity to the electrode and as a result a much more efficient cutting and gouging action results in the use of this tool.

Figure 12:
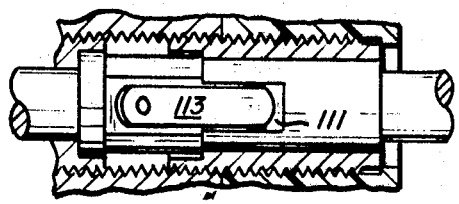
FIG. 12 is a view taken generally along the line 12—12 of FIG. 11.
Figure 11:
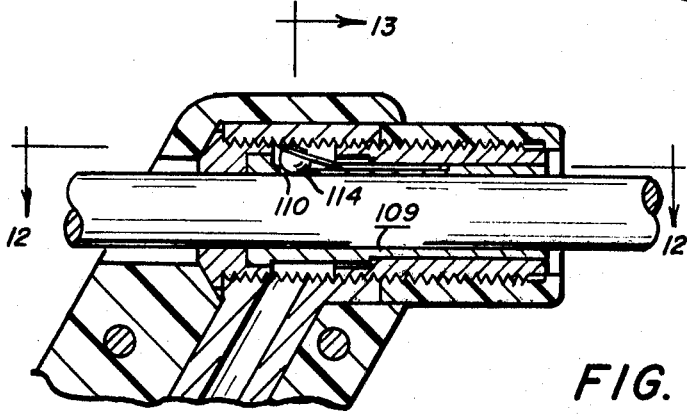
FIG. 11 is a fragmentary elevational view of a further modification of the head of the metal cutting guns shown in FIGS. 1 and 5.
Figure 13:
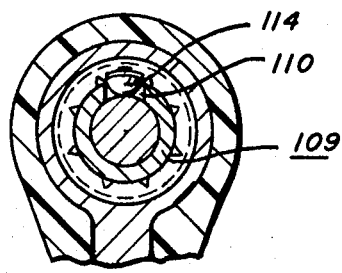
FIG. 13 is a view taken generally along the line 13—13 of FIG. 11.

FIGS. 11, 12 and 13 show a still further modification of the metal cutting gun and these figures show a modification primarily over the construction which has been in FIGS. 9 and 10. In this modification, where possible, the same reference numerals have been utilized where the construction is essentially the same as that shown in FIGS. 9 and 10. In this construction, a tube or annular member 109 has been provided which has the same diameter portions as the tube 98. A radially extending opening 110 is provided in the tube member 109 and the outer surface of the tube is provided with a flattened surface 111. A leaf spring 113 resides or is located on the flattened surface 111 and one end of the leaf spring is integrally secured to an electrode engaging member 114 which resides in the opening 110. The end of the leaf spring which is opposite the electrode engaging member is secured in position between the air ejection member 72 and tube 109 as more specifically shown in the drawings. In this particular regard, the electrode engaging member is constantly biased toward the bore of the tube 109 through the opening 110 and when an electrode is inserted axially through the tube the engagement of the electrode engaging member 114 serves to restrict or retard the axial movement of the electrode through the device. This particular construction is extremely advantageous because if the electric current which is transferred through the chuck or the electrode engaging member to the electrode, happens to burn or damage this particular construction, it is only necessary to dispose of the leaf spring 113 and the electrode engaging member 114 and replace the same. This is distinguished from completely replacing the tube 98 in the construction of FIGS. 9 and 10.

Figure 14:
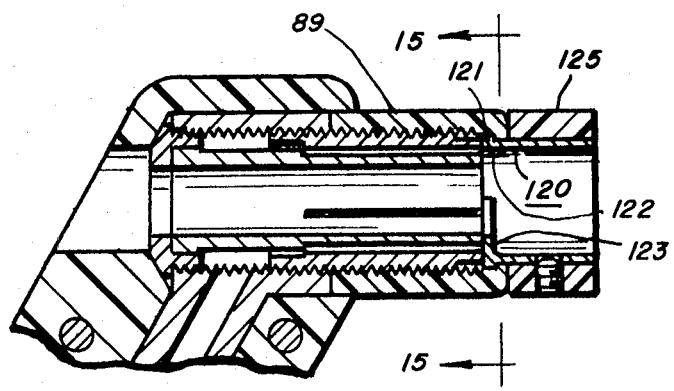
FIG. 14 is a fragmentary elevational view of the metal cutting gun shown in FIG. 9 with air deflector means attached to the head.
Figure 15:
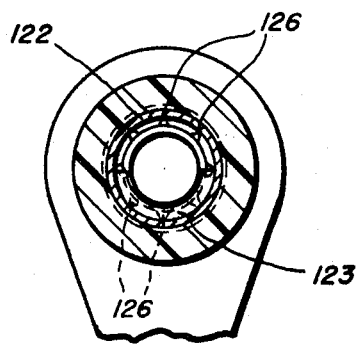
FIG. 15 is a view taken generally along the line 15—15 of FIG. 14.

FIGS. 14 and 15 show or illustrate the use of a deflector means in association with the gun construction of FIGS. 9 and 10. In this construction there is provided an annular member 120 which is provided with a large diameter portion 122 and a smaller diameter portion 123. The annular member is provided with a shoulder 121 which permits insertion of the annular member 120 from the left side of the construction shown in FIG. 14 prior to the shield 89 being screwed onto the air ejection member 17 in assembling the gun. A retaining ring 125 is secured to the annular member 120 by a set screw as shown and this construction enables the annular member to be rotated so as to cover over various of the air openings 126 when desired by an operator of the gun. The use of this particular deflector means is important when the cutting and gouging gun is used in a position where the electrode is perpendicular to the work surface being operated on. When all of the openings which surround the electrode are uncovered, the air pressure applied to the molten metal of the workpiece is essentially the same all the way around the electrode and as a result sometime difficulty is occasioned in blowing molten metal away. By covering a given number of the air openings, there is produced a pressure differential on one side of the electrode as distinguished from the other which causes the molten metal to be conveniently removed when the electrode is being held in a position perpendicular to the workpiece.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for metal cutting comprising a head, an electrode chuck located within said head, wall means defining a plurality of openings in said head whereby air under pressure may be emitted through said plurality of openings around an electrode held by said chuck, valve means attached to said head and located adjacent the end of said openings to block off selected ones of said openings, said valve means comprising an annular member having a larger diameter portion which lies outside the diameter of said openings and a smaller diameter portion which lies on the diameter of said openings and is of such circumferential extent as to obstruct the flow of air through said selected ones of said openings.

2. Apparatus as claimed in claim 1, wherein said annular member is rotatable whereby selection of the openings to be obstructed can be readily accomplished.

3. A chuck for an electrode-type member including in combination an annular member having an inner bore to receive said electrode type member and having an outer surface fitting within a housing member, said outer surface having a flattened portion, wall means defining an opening through the wall of said annular member, an electrode engaging member extending through said opening defined by said wall means into said bore to engage an electrode-type member, and spring means acting on said electrode engaging member tending to urge same into said bore, said spring means comprising a leaf spring having one end portion fixedly mounted by being positioned between the flattened portion of said outer surface of said annular member and said housing member, the other end portion of said leaf spring being secured to said electrode engaging member.

* * * * *